A. J. KOEGLER.
REGULATOR FOR GRAIN HEATERS.
APPLICATION FILED SEPT. 7, 1909.
966,564.
Patented Aug. 9, 1910.
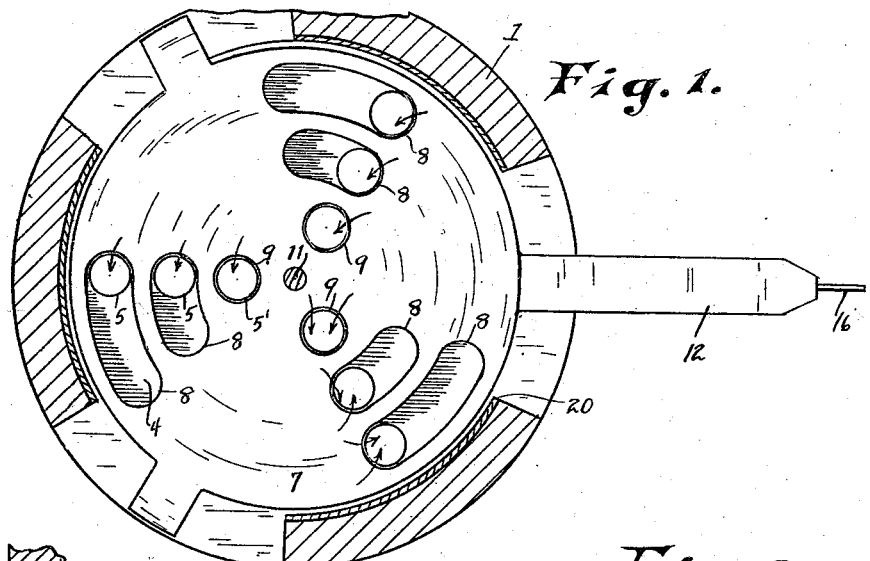
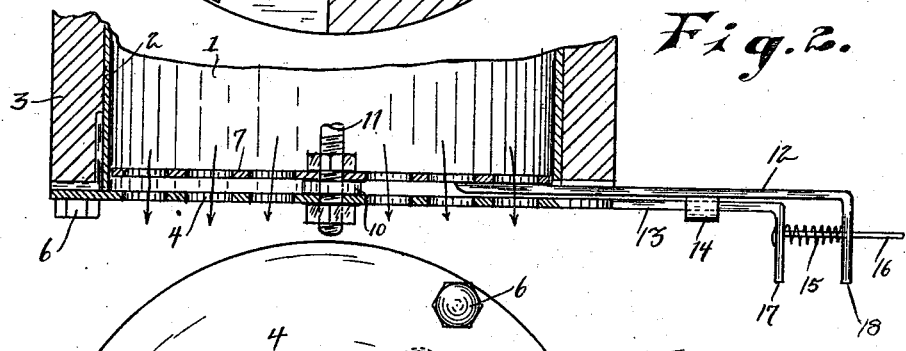
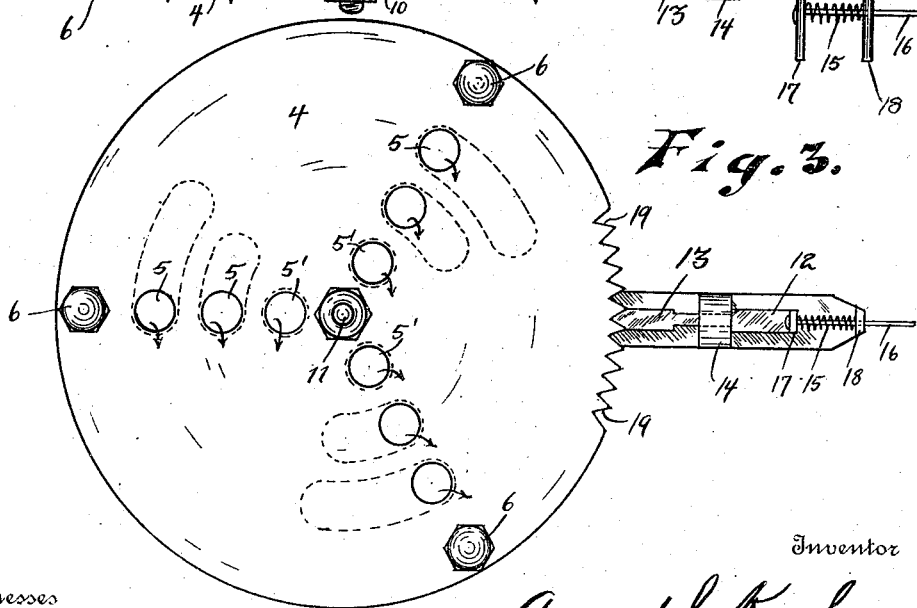

UNITED STATES PATENT OFFICE.

AUGUST J. KOEGLER, OF MILWAUKEE, WISCONSIN.

REGULATOR FOR GRAIN-HEATERS.

966,564.  Specification of Letters Patent.  Patented Aug. 9, 1910.

Application filed September 7, 1909. Serial No. 516,536.

*To all whom it may concern:*

Be it known that I, AUGUST J. KOEGLER, a citizen of the United States, residing at Milwaukee, county of Milwaukee, and State of Wisconsin, have invented new and useful Improvements in Regulators for Grain-Heaters, of which the following is a specification.

My invention relates to improvements in grain heaters, and it pertains more especially, among other things, to the device for regulating and stopping the flow of grain through the heater.

It will be understood that when a uniform temperature is maintained in the heater, the flowing grain will become more or less heated according to the time it is retained in the heater. It therefore follows, that by regulating the discharge, the grain may be retained in the heater until, and only until brought to the required temperature; also that when the temperature in the heater is raised, the discharge ports may be opened and adjusted to permit the grain to flow more rapidly, and when the temperature is lowered, such ports may be partially closed, so that the grain will be retained in the heater the required length of time to become properly heated.

The object of my invention is,—first, to provide a simple and efficient device for controlling the discharge of grain from a grain heater, and second, to provide a device, which may be more conveniently regulated and locked at any desired point of adjustment than those heretofore made.

My invention is further explained by reference to the accompanying drawings, in which, Figure 1 represents a top view of the grain regulating device. Fig. 2 is a vertical section, and Fig. 3 is a bottom view thereof.

Like parts are identified by the same reference numerals throughout the several views.

1 represents the lower end of a grain heater of ordinary construction, comprising among other things, a vertical wall 2 and the inclosing covering 3.

4 is the bottom member of the heater, which is provided with a plurality of round apertures or ports 5—5'. The bottom member 4 is rigidly secured to the lower end of the heater by a plurality of bolts 6.

The flow of grain through the apertures 5 and 5' is regulated by the adjustable disk 7, which disk is provided with a plurality of elongated apertures 8 and round apertures 9, and said disk is centrally supported from the bottom member 4, by and upon a washer 10 and central bolt 11, around which bolt it is adapted to perform a partial revolution when regulating the discharge of grain.

12 is an operating lever, which is rigidly connected at its inner end to the disk 7, and extends outwardly past the sides of the heater where it may be conveniently reached and operated.

13 is a latch, which is slidably secured to the lower side of the lever 12 by the retaining keeper 14.

15 is a spring, which is supported from the latch 12 by the rod 16 between the downward projecting latch bearings 17 and the lever bearings 18, and the tension of said spring is such as to force the latch inwardly against the edge of the bottom member 4. The edge of the bottom member 4 is provided with a series of notches 19 for the reception of the inner end of said latch, whereby the regulating disk is retained at any desired point of adjustment.

In view of the fact that a given movement of the regulating disk around its central support causes its periphery to travel much farther than its center, it becomes necessary to make the apertures in said disk proportionately longer, as shown in Fig. 1, whereby when the apertures 8 and 9 of the disk are brought directly over the discharge apertures 5—5' of the bottom member, all the apertures in both the bottom member and disk will be brought into alinement with each other, whereby the grain will be discharged at its maximum speed. When, however, it is desired to retard the flow of grain, the regulating disk is moved until the ends of the apertures 8 of the disk are brought partially above the apertures of the bottom member, whereby the escape of grain will be proportionally retarded, and when desired to close the apertures, the operating lever 12 is moved until brought in contact with the stop 20, whereby the apertures 8 and 9 will be moved past all the apertures in the bottom member, whereby the escape of grain will be stopped.

Having thus described my invention what I claim as new and desire to secure by Letters Patent, is,

1. In a grain heater, the combination of a bottom member provided with a plurality of apertures rigidly secured to the lower end of said grain heater, a regulating disk provided with a plurality of apertures centrally supported from said bottom member, means for turning said regulating disk a partial revolution around its central support, and means for locking said disk at any desired point of adjustment.

2. In a grain heater, the combination of a bottom member provided upon one side with a plurality of notches rigidly secured to the lower end of said grain heater, a regulating disk centrally supported from said bottom member, said bottom member and regulating disk being respectively provided with opposing sets of apertures adapted to register with each other, the apertures in one of said sets being elongated, or of greater width than the apertures of the other set, whereby the passages through all of said apertures may be simultaneously opened and closed by the movement of said regulating disk, means for turning said regulating disk a partial revolution around its central support, and means for locking said disk at any desired point of adjustment.

3. In a grain heater, the combination of a bottom member provided with a plurality of apertures and a series of notches, said bottom member being rigidly secured to the lower end of the grain heater, a regulating disk provided with a plurality of apertures adapted to register with the apertures of said bottom member, said disk being centrally supported from said bottom member, an operating lever rigidly affixed at one end to said disk and having its free end projecting past the vertical sides of the steam chamber, a latch slidably secured to said operating lever, and means for yieldingly retaining the inner end of said latch in operative contact with the notches of said series.

In testimony whereof I affix my signature in the presence of two witnesses.

AUGUST J. KOEGLER.

Witnesses:
  JAS. B. ERWIN,
  LEVERETT C. WHEELER.